(12) United States Patent  (10) Patent No.: US 6,553,311 B2
Ahearn et al.  (45) Date of Patent: Apr. 22, 2003

(54) NAVIGATIONAL OFF- LINE AND OFF-HEADING INDICATION SYSTEM AND METHOD

(75) Inventors: John Ahearn, Christchurch (NZ); Arthur Lange, Sunnyvale, CA (US); Scott Crozier, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/733,862

(22) Filed: Dec. 8, 2000

(65) Prior Publication Data

US 2002/0072851 A1 Jun. 13, 2002

(51) Int. Cl.$^7$ ............................................. G01C 21/00
(52) U.S. Cl. .................... 701/213; 701/50; 340/815.45; 340/937; 342/357.13; 342/357.17
(58) Field of Search ........................... 701/213, 50, 23; 340/815.45, 937, 901, 436, 903, 905, 525; 342/357.13, 357.17, 357.08, 357.02

(56) References Cited

U.S. PATENT DOCUMENTS 3,643,258 A * 2/1972 Balding ...................... 342/413
5,266,958 A * 11/1993 Durboraw, III ........ 342/357.08
5,945,917 A * 8/1999 Harry .................... 340/815.45
5,952,961 A * 9/1999 Denninger ............. 342/357.08
5,987,383 A * 11/1999 Keller et al. ................. 701/213
6,087,984 A * 7/2000 Keller et al. ........... 342/357.17
6,100,791 A * 8/2000 Bader et al. ................ 340/331
6,199,000 B1 * 3/2001 Keller et al. .................. 701/50
6,278,945 B1 * 8/2001 Lin ............................. 701/216
6,285,317 B1 * 9/2001 Ong ....................... 342/357.13

* cited by examiner

Primary Examiner—William A. Cuchlinski, Jr.
Assistant Examiner—Marthe Y. Marc-Coleman
(74) Attorney, Agent, or Firm—Wagner Murabito & Hao LLP

(57) ABSTRACT

A system and method that provides off-line and off-heading correction information in a convenient format that is easy for an operator to comprehend. A dual mode indication system provides two different types of navigation information in a single device presentation configuration that is efficient and effective. The dual mode indication system presents information in a manner that is intuitive with minimal sensory resource commitment. Providing the off line and off heading in simplified and effective formats assists a vehicle operator to keep a vehicle on a desired line and moving in a correct direction with minimal operator effort expended observing, interpreting and analyzing the navigation information.

24 Claims, 9 Drawing Sheets

800

```
Processing navigation information
810
            ↓
Determining vehicle off line information and off heading
information
820
            ↓
Providing an easy to comprehend dual mode presentation of
the off line information and the off heading information
830
```

FIG. 8

NAVIGATIONAL OFF- LINE AND OFF-HEADING INDICATION SYSTEM AND METHOD

FIELD OF THE INVENTION

The present invention relates to the field of navigational guidance systems and methods. More particularly, the present invention relates to a system and method that provides off-line and off-heading navigation information.

BACKGROUND OF THE INVENTION

Accurate and convenient navigation information has made a significant contribution towards the advancement of modern society and is utilized in a number of applications to achieve advantageous results. Vehicles (e.g., planes, cars, tractors, boats, construction vehicles, etc.) have facilitated increased productivity and reduced costs in a variety of areas including transportation, construction, farming, defense, etc. The benefits provided by these vehicles are often dependent upon an operator's ability to accurately navigate a course along a designated path. However, vehicle operators typically do not have the pure natural sensory ability to precisely navigate a particular course unaided and they are usually dependent upon devices that provide navigation assistance. For example, it is often relatively difficult for an operator to keep a vehicle on a particular navigational line and heading. Due to the relatively complexities and attention required to operate numerous vehicles it is important that the navigation information be provide in convenient and easy to perceive formats.

Efficient navigation usually provides resource conservation and increased activity benefits. For example, accurately guiding a vehicle such as a ship or plane along a straight line path between a launching point and destination typically saves fuel and time. Accurately guiding a vehicle is also important in avoiding dangerous conditions (e.g. shallow waters, mountains, etc.) Vehicles are often used to perform tasks in which relatively precise navigational operation provides increased production results. For example, it is often advantageous for tractors and other vehicles utilized in farming operations to accurately follow uniform row designs during planting, dusting and harvesting crops. Following uniform rows during these activities usually facilitates increased production with the expenditure of reduced resources. For example, accurately navigating agriculture patterns helps assure seeds are located in the appropriate portion of a row, pesticide spraying actually hits the crops, and crops are not missed during harvesting.

Ultimate navigation control of a typical vehicle usually resides with the vehicle operator. Even in automated navigation situations the operator usually has override capabilities. An operator typically guides a vehicle by physically manipulating the vehicle navigation controls (e.g., a steering wheel). The manual control manipulations required to guide a vehicle along a desired path are often very complex. For example, planes, heavy construction vehicles, agricultural equipment, cargo ships and oil tankers usually require a significant level of concentration and dexterity skills when trying to precisely follow a designated path. Efficient and easy to use navigation aids make an operator's navigation task easier and allows the operator to spend more concentration on the manual manipulations of a vehicle guidance system.

Navigation information often comprises numerous components and is presented in a number of ways. One important component of navigation information is an indication of a line of travel and the another is heading information. Not accurately following a line of travel has detrimental affects such as not planting a row of vegetation correctly. Typically, tractors used for planting rows of crops are operated manually by an operator who drives the tractor along each row to be planted or harvested. It is usually difficult for an operator of a tractor to maintain relatively precise positioning of the tractor relying only upon unaided natural perception and ability to interpret if they are accomplishing the objective. Even if the operator realizes they are on the wrong line it is usually very difficult to determine the appropriate adjustment to make to correct the problem. Effective off heading information is important because it provides an indication of the direction the vehicle should point to get on the correct line. Operators usually utilize their sensory faculties (e.g., sight, hearing) to receive navigational information feedback and make adjustments to a vehicle line and heading. However, human navigational frailties make following a precise line and an appropriate heading difficult. Traditional navigation information systems attempt to assist an operator overcome human navigational frailties.

In an attempt to make the operation of vehicles easier for the operator, some traditional navigation aids attempt to provide the operator with navigational information. However, traditional navigation information systems usually provide navigational assistance in a relatively complicated manner. Traditional navigational aids typically provide information in a format that still requires a significant level of the operators sensory and concentration resources. For example, some traditional navigational aids provide information in a textual format with complicated technical content (such as a printout of latitude and longitude data, or a compass direction, etc.). Traditional textual information typically requires a high level of comprehension of complicated navigational relationships and terms.

Traditional navigational aids often rely on electronic systems to provide information. These navigational aids typically utilize a global positioning system (GPS) to determine a position. One potential beneficial use of a GPS is for guiding a vehicle to move on a predetermined path (e.g., planting crops, navigating hazardous geographic environments (a harbor, straits, canyon, swamp, etc.). Some traditional devices that rely on GPS and attempt to provide navigation information to an operator in a relatively easy format to comprehend and interpret but do not typically provide sufficient navigation information. For example, a traditional device may provide information on a line but not corrective heading information. Other traditional navigational aids attempt to provide a significant amount of navigational information on a single screen with a single scale such as utilizing different symbols on the same scale to represent different navigation information. These traditional aids often require significant operator concentration to make sure they are focused on the correct symbol and interpret what units are associated with that symbol on the scale.

What is required is a system and method that provides off-line and off-heading correction information in a convenient format that is easy for an operator to comprehend.

SUMMARY

The present invention is a system and method that provides off-line and off-heading correction information in a convenient format that is easy for an operator to comprehend. A dual mode indication system of the present invention provides two different types of navigation information in a single device presentation configuration that is efficient and effective. The dual mode indication system presents information in a manner that is intuitive with minimal sensory resource commitment. In one embodiment of the present invention the dual mode indication system includes a light emitting diode (LED) light bar that provides off line information by selectively illuminating LEDs in a pattern that corresponds to the relative position of a vehicle to a desired line of travel (e.g., along an agricultural planting row). In one embodiment of the present invention the dual mode indication system includes an analog dial that provides an indication of an appropriate heading for the vehicle to make adjustments and stay on heading and on line. In one exemplary implementation of the present invention the analog dial rotates to point in an appropriate heading. Providing the off line and off heading in these simplified and effective formats permits assist a vehicle operator keep a vehicle on a desired line and moving in a correct direction with minimal operator effort expended observing, interpreting and analyzing the navigation information.

DESCRIPTION OF THE DRAWINGS

FIG. 8 is a flow chart of a dual mode indication method, one embodiment of the present invention.

DETAILED DESCRIPTION

Figure 1:
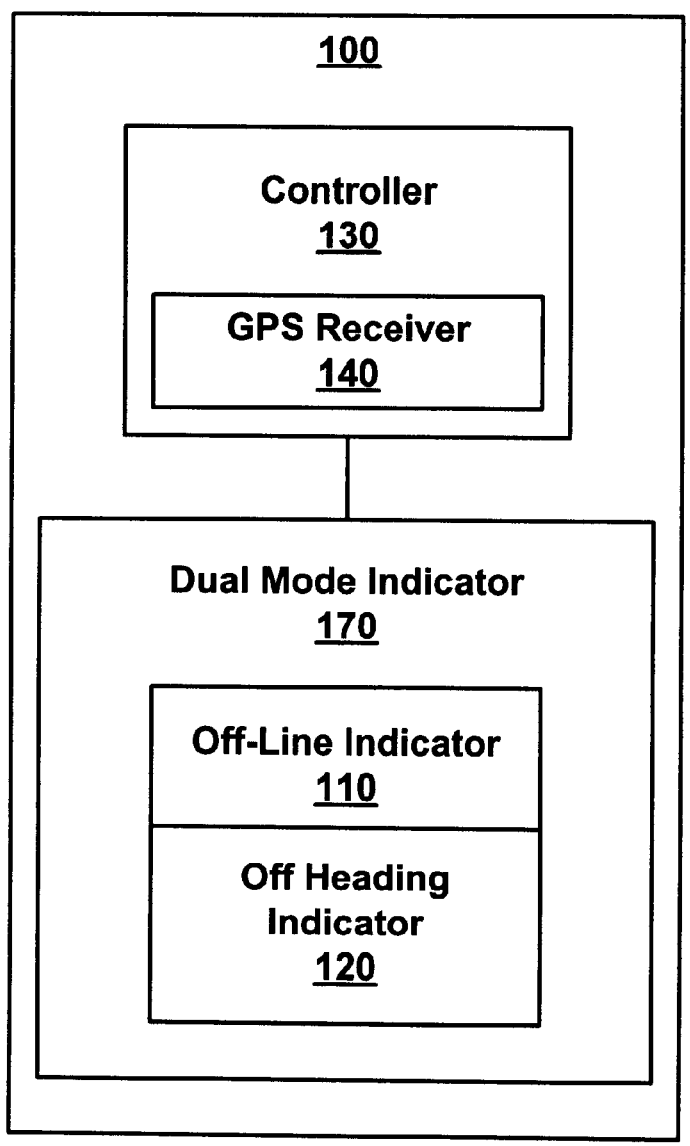
FIG. 1 is a block diagram of a dual mode indication system of one embodiment of the present invention.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention is a navigational aid that provides two different types of navigation information in a convenient and easy to use format. A dual mode indication system and method of the present invention provides the navigation information in a user friendly format that assists an operator to maneuver a vehicle to line up and be located on a particular path (e.g., a track) with zero off track error and zero heading error. The present invention facilitates greater navigation accuracy with reduced operator fatigue.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "computing," "translating," "instantiating," "determining," "displaying," "recognizing," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices.

FIG. 1 is a block diagram of dual mode indication system 100, one embodiment of the present invention. Dual mode indication system 100 comprises a controller 130, a communication bus 150 and a dual mode indicator 170 including off-line indicator 110 and an off heading indicator 120. Communication bus 140 is coupled to off-line indicator 110, an off heading indicator 120, and indication controller 130. Off line indicator 110 (e.g., a light bar) is adapted to provide line of movement information in a convenient and easy to comprehend format. Off heading indicator 120 (e.g., an analog dial) is adapted to provide an indication in a convenient and easy to comprehend format of an appropriate heading adjustment for bringing a vehicle back on a desired line of travel. Controller 130 is adapted to control off-line indicator 110 and off heading indicator 120. In one embodiment of the present invention, indication controller 130 includes GPS receiver 150. GPS receiver 150 functions by receiving and processing vehicle positioning information.

The heading adjustment provided by an off heading indicator of the present invention assists a vehicle operator to achieve a variety of objectives. For example, the off heading indicator provides an indication of an appropriate heading for the vehicle to make adjustments and stay on heading. An off heading indicator also provides an indication of an appropriate heading for the vehicle operator to make adjustments and intersect with a predefined waypoint. In one exemplary implementation the present invention provides the operator with off line and off heading information that assists the operator hit the beginning of a swath at the proper location and accurately follow (e.g., stay on) the swath.

In one embodiment of the present invention, GPS receiver 150 includes sufficient computational resources to execute various software routines which assist implementation of the present invention. Accordingly, GPS receiver 150 provides the computer system platform that executes software routines which assist implement the functionality for performing the line indication by lightbar 110 and heading correction for heading indicator 120. System 100 uses a GPS receiver 150 to determine a series of positions of a vehicle as the vehicle traverses a course (e.g., an agricultural field) and the corresponding ground track and ground speed of a vehicle in which system 100 is installed. GPS receiver 150 receives information associated with a series of positions and velocities. The embedded computer system of GPS receiver 150 is configured to analyze the information and determine a line of travel and an appropriate heading correction. The information records can be referenced with respect to time to show the vehicle's position and velocity on the field at a given time.

Figure 2A:
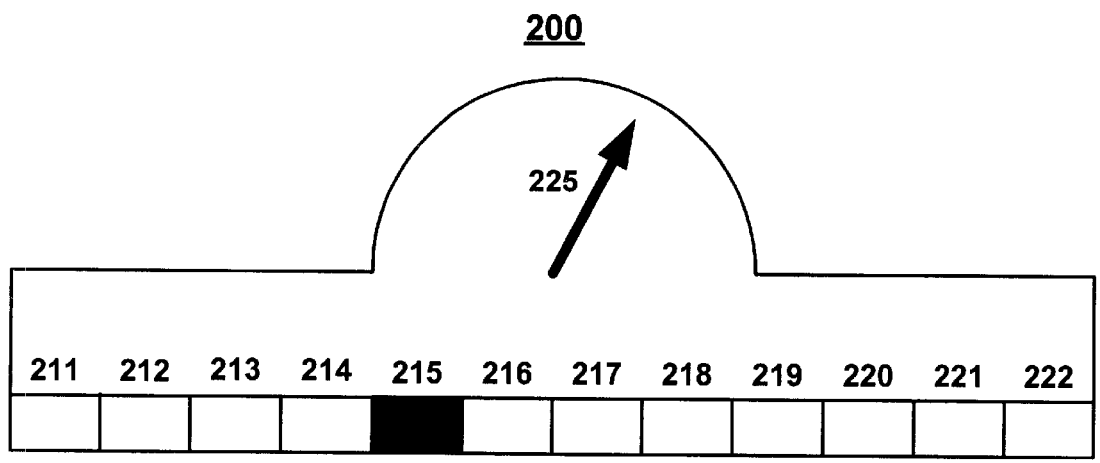
FIG. 2A is an illustration of one embodiment of a present invention dual mode light bar that includes an off line indicator light emitting diodes and an off heading indicator analog dial.
Figure 2B:
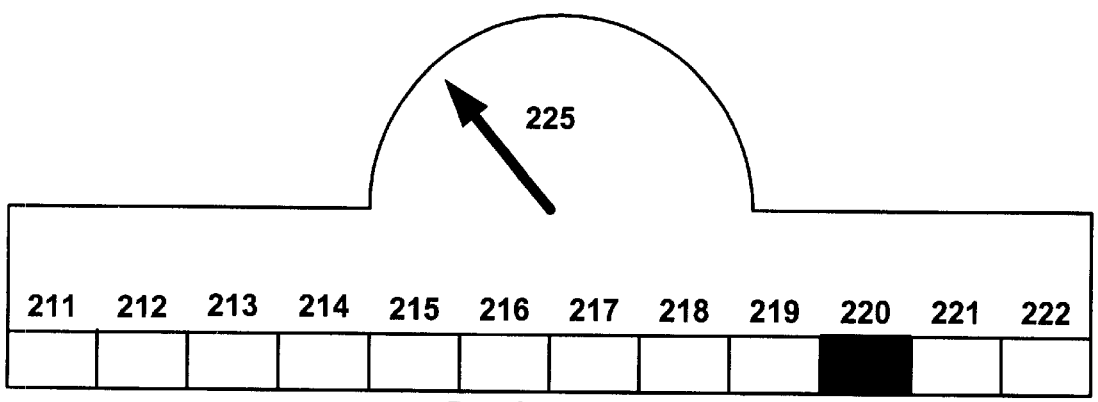
FIG. 2B depicts a light pattern emitted by an LED to the right and position of an analog dial pointing to the left.
Figure 2C:
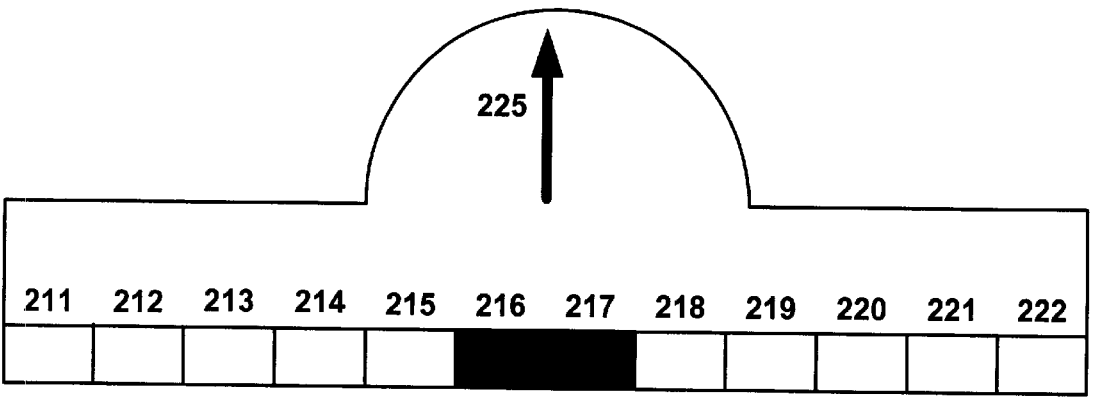
FIG. 2C depicts a light pattern emitted by LEDs in the center of a light bar and position of an analog dialpointing straight ahead.

With reference now to FIG. 2A, an embodiment of a present invention dual mode light bar 200 is illustrated that includes an off line indicator comprising light emitting diodes (LED's) 211 through 222 and an off heading indicator comprising analog dial 225. Off line indicator LED's 211 through 222 are arranged in a row as shown. LED's 211 through 222 are selectively illuminated to form a light pattern for providing off-line information to a vehicle operator. Analog dial 225 rotates to point out off heading correction information to a vehicle operator. For example, FIG. 2B depicts a light pattern emitted by LED 220 and position of analog dial 225 pointing to the left. FIG. 2C depicts a light pattern emitted by LED 216 and 217 and position of analog dial 225 pointing straight ahead. In one embodiment, the light pattern formed by the illumination of LED 220 indicates to the vehicle operator that the vehicle is traveling on a line that is off to the right and analog dial is indicating the vehicle operator should change the heading to point the vehicle to the left.

As the vehicle operator moves the vehicle towards the left, in one embodiment, a new light pattern is formed as depicted in FIG. 2. For this new light pattern, LED's 216 and 217 are illuminated in place of LED 220. The light pattern of LED 216 and 217 and the position of analog dial 225 appears to be centered, indicating that the vehicle is now moving along the desired line. However, the present invention is well suited to an embodiment in which light pattern and position of analog dial 225 depicted in FIG. 2B indicates that the vehicle operator is to move the vehicle to the right in order to achieve the centered light pattern depicted in FIG. 2C.

Figure 3:
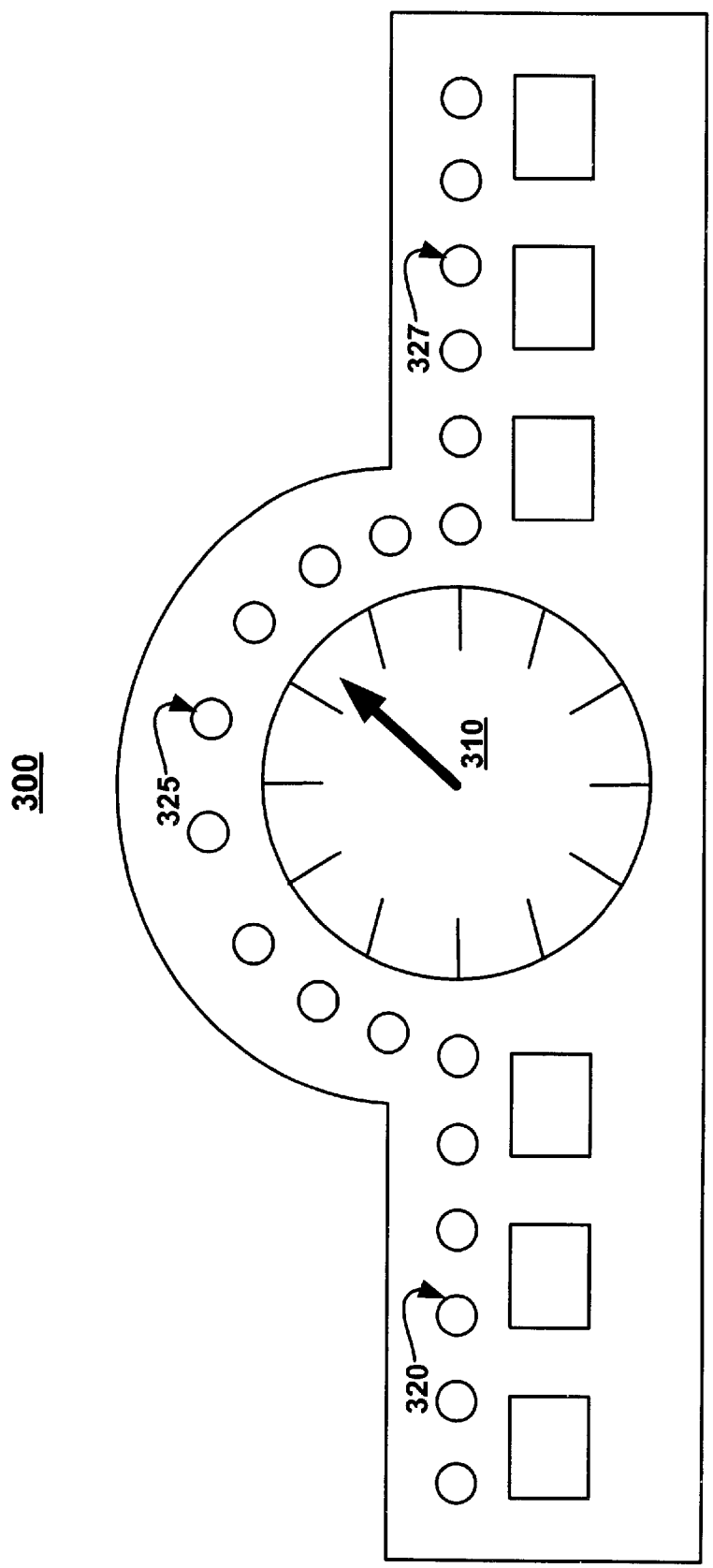
FIG. 3 is an illustration of another embodiment of a dual mode light bar configuration is which a center section of LEDs form a semicircular section.

FIG. 3 is an illustration of a dual mode light bar configuration 300, another embodiment of the present invention. Dual mode light bar configuration 300 comprises an off line indicator row of LEDs (e.g., LEDs 320, 325, 327, etc.) and an off heading indicator analog dial 310. The LED light bar follows a easy to interpret layout. The semicircular shaped center section provides two functions. One function is it gives the impression of a spirit level with the LEDs moving to the top of the semicircle as the off track error is eliminated, similar to the manner in which a bubble on a spirit level comes to the center as it reaches a horizontal position. By setting the LEDs within the semicircular portion of the light bar to show a pre determined off track error distance, the operator is able to determine from location of the lighted LED the off track error without counting the number of LEDs from the center to the lighted LED. This provides a convenient quick rough guide allowing the operator to decide an appropriate action at the beginning of a swath. In one exemplary implementation of the present invention, lighted LED is in the semicircular portion of the LED row indicate to the operators they should continue guidance on the desired track and make corrections. A lighted LED is in the horizontal portion of the LED row indicates to the operators they should start the row again because the required correction is to large The configuration of the off line indicator and off heading indicator are no limited to an LED row and analog dial respectively. For example, off heading indicator is easily adaptable to be an LED pattern and have numerous configurations (e.g., needle, pointer, arrow, etc.) In one exemplary implementation of the present invention, the off heading indicator is a circular configuration with LED hash marks (similar to the hash marks shown analog dial 310) at evenly spaced positions around the circumference that light up to indicate the correct heading. In one embodiment of the present invention the LED shapes in the off line indicator and off heading indicator are different (e.g., circular LED lights for off line and square for off heading or vise versa, etc.) shapes to assist an operator to avoid confusion and mistaken interpretation of the information. While the present invention is adaptable to presenting the off line and off heading information with similar types of displays, the different shapes of the indicator avoids presenting two different types of navigation information with the same type of indicators arranged in similarly confusing configurations.

Figure 4A:
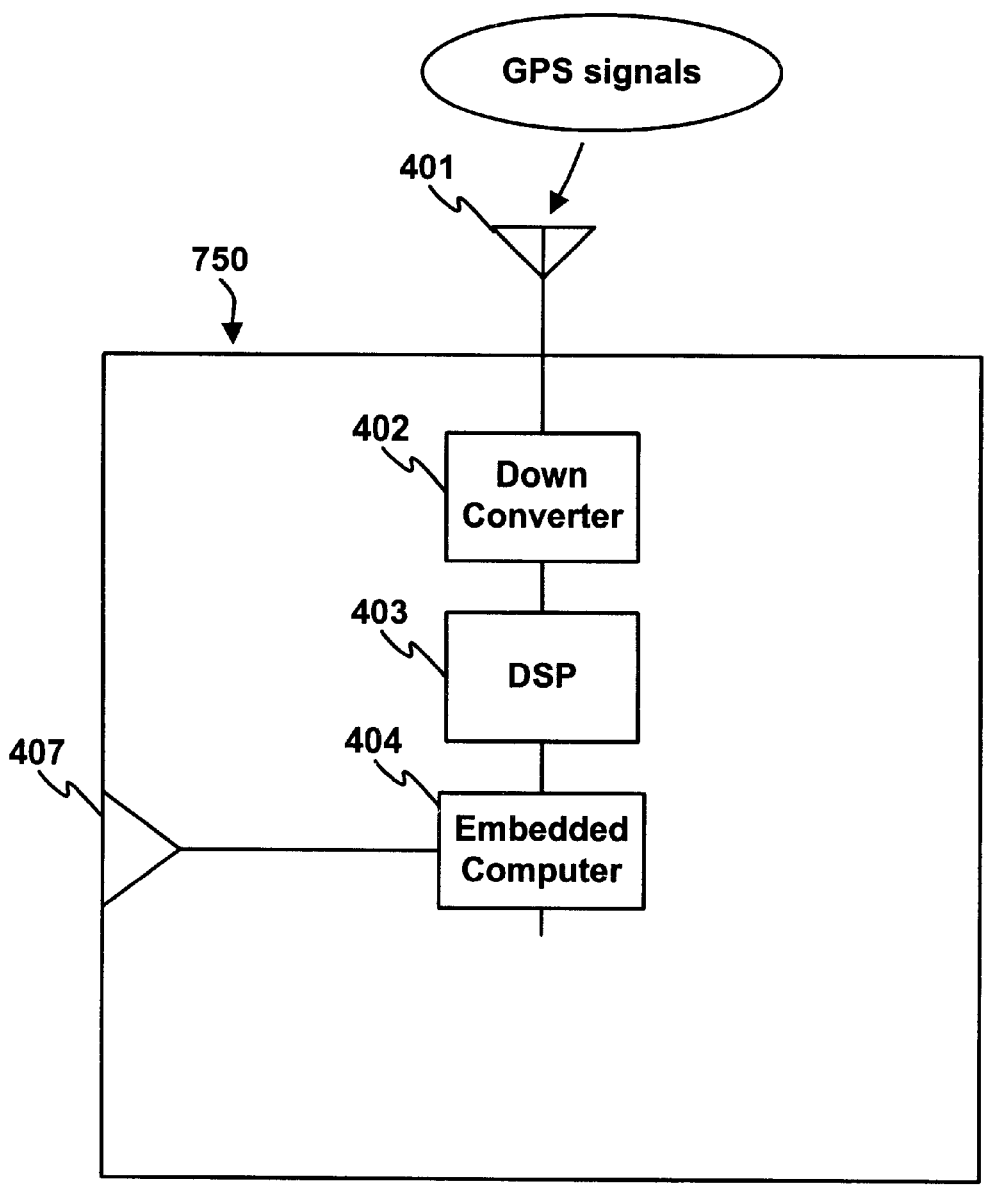
FIG. 4A is a block diagram of one embodiment of a present invention GPS receiver.

Referring now to FIG. 4A, a block diagram of GPS receiver 150 in accordance with one embodiment of present invention is shown. GPS receiver 150 is designed to communicate with GPS satellites arranged in a GPS constellation. In one embodiment of the present invention the GPS satellites of the constellation are located in six orbital planes, four satellites in each plane, having an inclination of 55 degrees relative to the equator and an altitude of approximately 20,200 km (10,900 miles). This positions each of the GPS satellites such that a minimum of five of them are normally observable (above the horizon) by a user anywhere on earth at any given time. The orbiting GPS satellites each broadcasts spread-spectrum microwave signals encoded with positioning data. The signals are broadcast on two frequencies, L1 at 1575.42 MHz and L2 at 1227.60 MHz. Essentially, the signals are broadcast at precisely known times and at precisely known intervals and are encoded with their precise time of transmission. A user receives the signals with a GPS receiver (e.g., GPS receiver 150) designed to determine an exact time of arrival of the signals and to demodulate the satellite orbital data contained therein. Using the orbital data, the GPS receiver 150 determines the time between transmission by the satellite and reception by the receiver and uses this information to determine a pseudo-range measurement of that satellite. By determining the pseudo-ranges of four or more satellites, GPS receiver 150 is able to determine its precise location in three dimensions, velocity, and a time offset which is used to generate a very precise time reference.

Referring to FIG. 4A, GPS receiver 150 comprises antenna 401, down converter 402, digital signal processor (DSP) 403, internal embedded computer 404, and communications port 407. Internal embedded computer 404 is coupled to communications port 407 and DSP 403 which is coupled to down converter 402. Down converter 402 is coupled to antenna 410. GPS receiver 150 receives GPS signals via antenna 401. The GPS signals are down converted via down converter 402, then de-spread and demodulated by DSP 403. DSP 403 passes the information to an internal embedded computer 404, which computes the correct pseudo ranges and determines the GPS-based position and velocity. In one embodiment of the present invention, the information can be communicated to the user via an optional display (not shown) coupled to the embedded computer. Communications port 407 couples GPS receiver 150 to bus 140 and provides a communication path for navigation information (e.g. off line, off heading information, etc.). In one embodiment of the present invention GPS receiver 150 includes an input/output component (not shown) as an additional means for communicating information (e.g., configuration information, navigation information, etc.).

It should be appreciated that GPS receiver 150 can be implemented as a differential GPS receiver (DGPS), which provides greater accuracy. To improve the accuracy of GPS determined PVT, differential GPS systems have been developed and widely deployed. As is well known, differential GPS functions by observing the difference between pseudo range measurements determined from the received GPS signals with the actual range as determined from the known reference station point. The DGPS reference station determines systematic range corrections for all the satellites in view based upon the observed differences. The systematic corrections are subsequently broadcast to interested users having appropriate DGPS receivers. The corrections enable the users to increase the accuracy of their GPS determined position. Differential correction broadcasts are currently in wide use throughout the world. Tens of thousands of DGPS receivers have been built and are in operation.

Alternatively, it should be appreciated that GPS receiver 150 can also be implemented as an RTK (real-time kinematics) GPS receiver. RTK is an even more accurate technique for improving the accuracy of GPS. As is well known, RTK involves the use of two or more GPS receivers which are coupled via a communications link (usually RF based). The GPS receivers are spatially separated and communicate to resolve ambiguities in the carrier phase of the GPS signals transmitted from the GPS satellites. The resulting carrier phase information is used to determine an extremely precise position (e.g., within 2 to 3 centimeters). Thus, RTK GPS receivers are among the most accurate navigation and surveying instruments available.

Figure 4B:
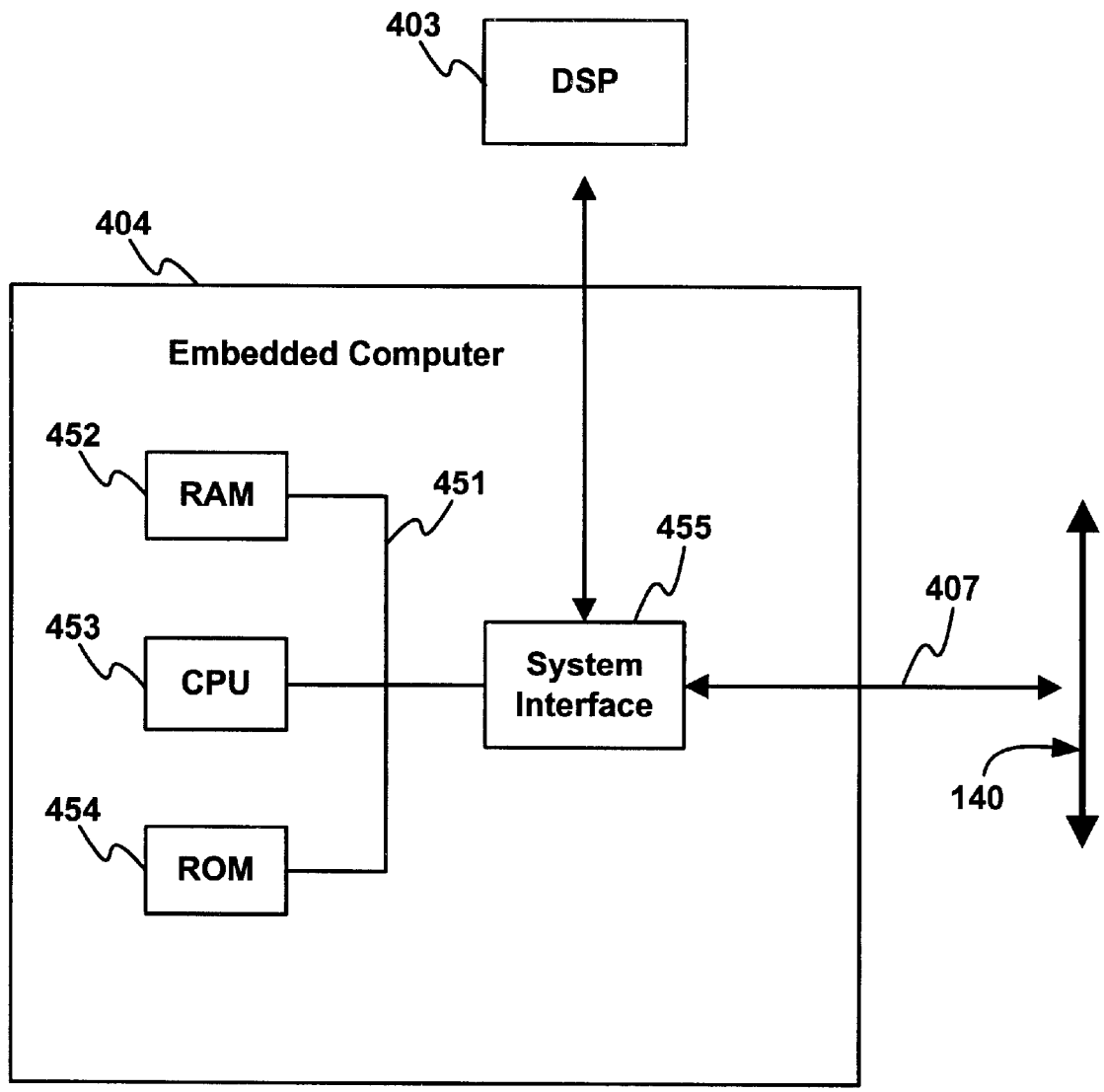
FIG. 4B shows a more detailed diagram of an embedded computer system included in one embodiment of the present invention.

FIG. 4B shows a more detailed diagram of embedded computer 404 of FIG. 4A. In one embodiment of the present invention, computer system 404 used by the present invention comprises an address/data bus 451 for communicating information, one or more central processors 453 coupled with bus 451 for processing information and instructions, a computer readable volatile memory unit 452 (e.g., random access memory, static RAM, dynamic RAM, etc.) coupled with bus 451 for storing information and instructions for central processor(s) 453, a computer readable non-volatile memory unit (e.g., read only memory, programmable ROM, flash memory, EPROM, EEPROM, etc.) coupled with bus 451 for storing static information and instructions for central processor(s) 453. System 404 can optionally include a mass storage computer readable data storage device, such as a magnetic or optical disk and disk drive coupled with bus 451, for storing information and instructions. System 404 can also couple to a display (not shown) for displaying information to the computer user, and an input output device (not shown) including, for example, alphanumeric and function keys for communicating information and command selections, cursor control inputs, command selections, etc. Also included in the embedded computer 404 is a system interface unit 455 for interfacing bus 451 with bus 140, DSP 403, port 407 and optional input/output components or displays (not shown).

As described above, GPS receiver 150 includes sufficient computational resources to host software programs which implement many features and functions of the present invention. In the present embodiment, the software is executed on the computer system platform provided by embedded computer 404. In one embodiment of the present invention, certain processes and steps are realized as a series of instructions (e.g., software program) that reside within computer readable memory units of system 404 and are executed by processors of system 404 (shown in FIG. 4B). When executed, the instructions cause the computer system 404 to perform specific actions and exhibit specific behavior. The software interacts with the other components of system 100 of FIG. 1 via message passing and communication protocols of port 407 and bus 140. Specifically, it should be appreciated that aspects of the present invention, described herein, are discussed in terms of functions or steps executed on a computer system platform. Although a variety of different computer systems can be used with the present invention, an exemplary general purpose computer system is shown in the embedded computer 404 of FIG. 4B. It should further be appreciated that alternatively, any other one or more components of system 100 can be configured to include the necessary computational resources and thereby provide a computer system platform for executing the software of the present invention.

Figure 5:
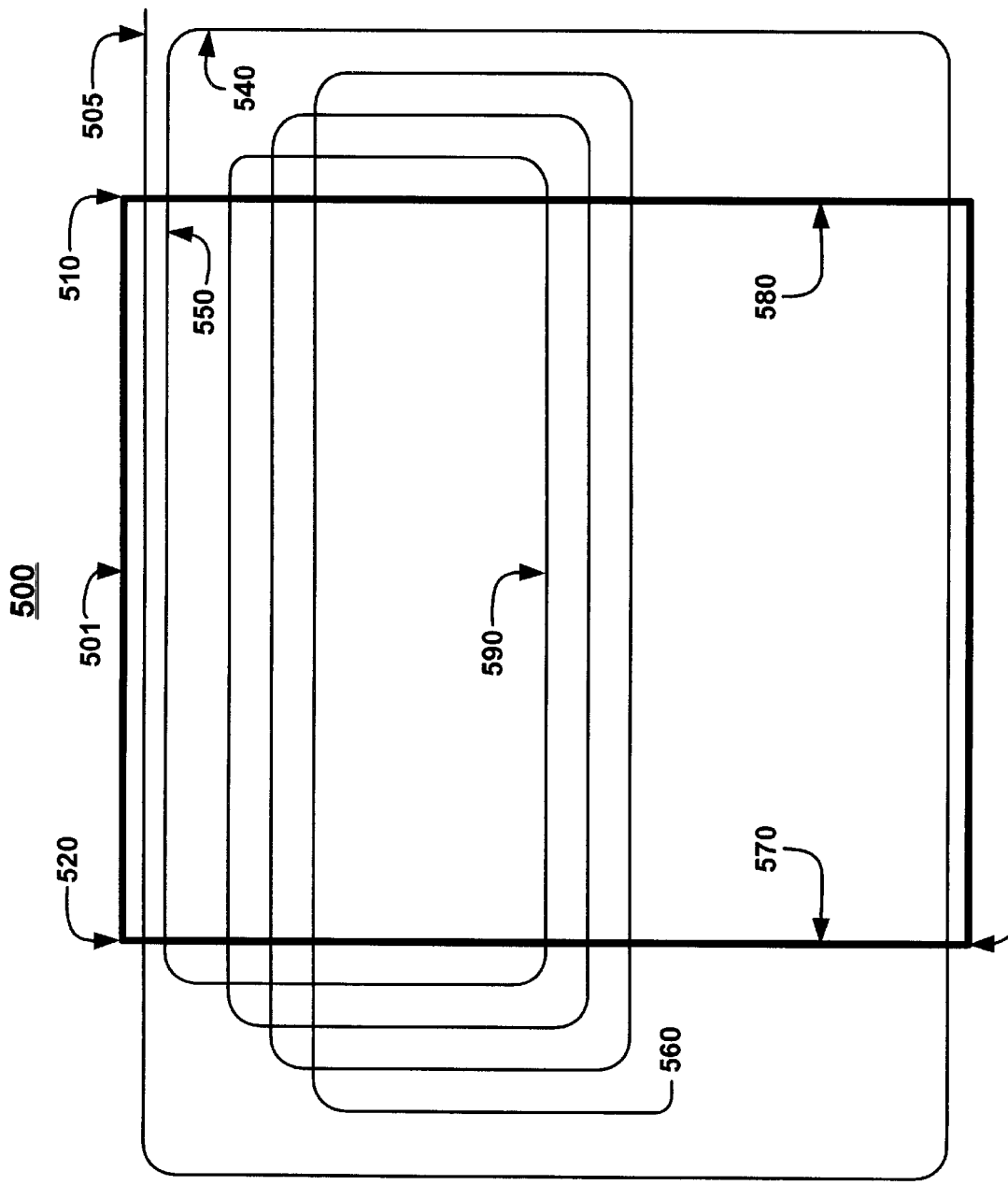
FIG. 5 is one exemplary diagram of a desired half field race track pattern for straight rows in an agricultural field.

The present invention facilitates navigating a variety of track patterns. FIG. 5 is one exemplary desired half field race track pattern 500 for rows in an agricultural field 501. A vehicle (e.g., tractor, plane, etc.) starts at point 505 and marks corners 510, 520 and 530 providing the basic parameters of the field to a dual mode indication system of the present invention. The operator then begins the half field race track spraying of the field alternately turning on and off the sprayer when the vehicle passes side 570 and 580 of field 501. The easy to perceive and interpret dual information of a present invention frees up sensory and concentration resources for other activities. Checking information that affects the spraying (such as wind, levels of spray left, turning on and off, etc.) takes a fair amount of the operators attention when making the critical approach to the beginning of a row.

In one exemplary implementation of the present invention, on line is considered accurately moving from side 570 to 580 (e.g., line 590). The dual mode indication system provides easy to comprehend navigation information to assist the operator in guiding the vehicle accurately along the desired half field race track pattern 500. For example, the dual mode indicator provides information on entering the field accurately at point 550 on a correct line and heading.

Along path 540 the off line indicator is going to indicate that the vehicle is off line but this alone is not necessarily helpful since at points making the turns between lines the vehicle is significantly off line. At some points the vehicle may be on line if the heading is not accurate when the vehicle enters the field it will soon be off line. The dual mode indicator system assists the operator overcome these problems by providing easy to comprehend off heading information to get the vehicle to a proper point of entry (e.g., point 550) at a correct heading with minimal wavering (e.g., overshooting). This assists the operator to keep the vehicle straight on line and going in the correct direction.

Figure 6:
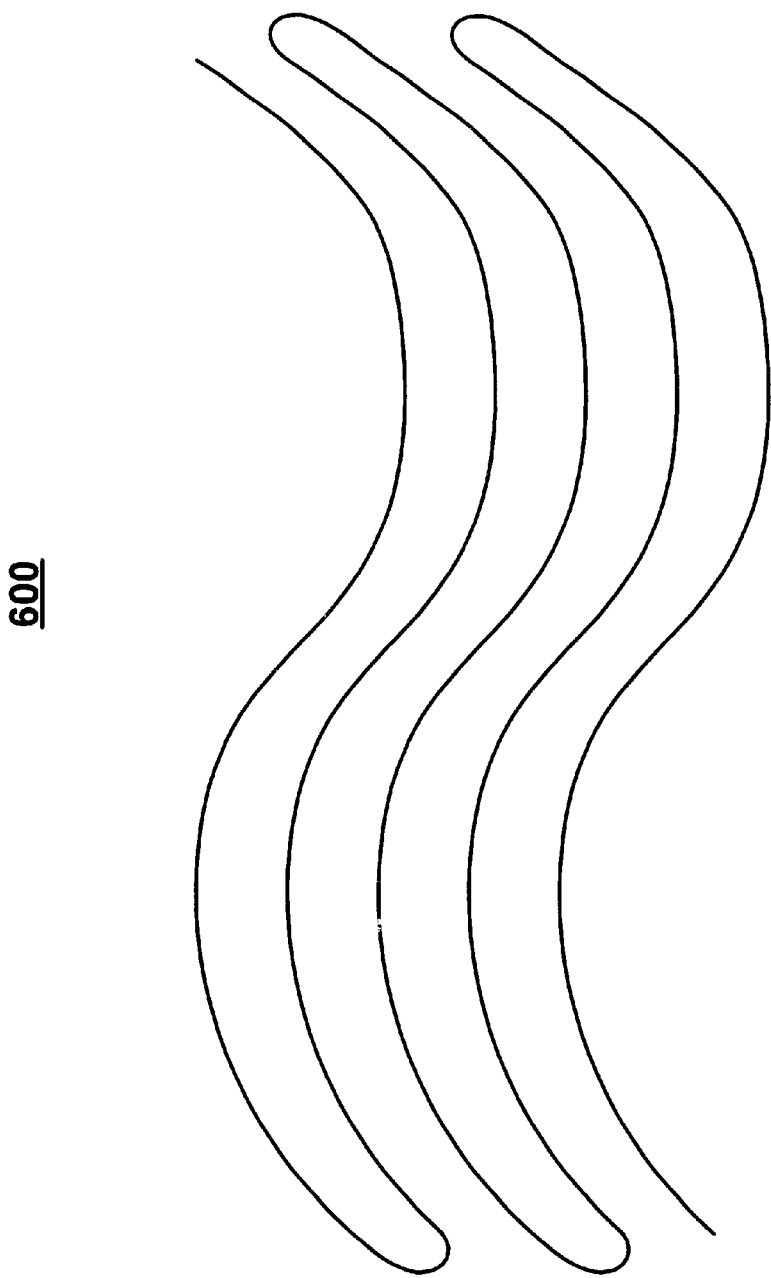
FIG. 6 is another illustration of an exemplary desired curved track pattern for curved rows in an agricultural field.

FIG. 6 is another illustration of an exemplary desired curved track pattern 600 for rows in an agricultural field. In pattern 600 the track follows a curved path requiring the operator to make continuous heading adjustments to maintain zero off track error. In one embodiment of the present invention, a dual mode indication system includes a look ahead feature that determines the required heading correction for the track and vehicle dynamics which are displayed by the off heading indicator (e.g., analog needle) of the dual mode indication system.

In one embodiment of the present invention a dual mode indication system has a feature allowing an operator to select a smaller scale for an analog needle of an off heading indicator. This assists the operator in utilizing the dual mode indication system for guidance corrections less that three degrees off current heading.

Figure 7:
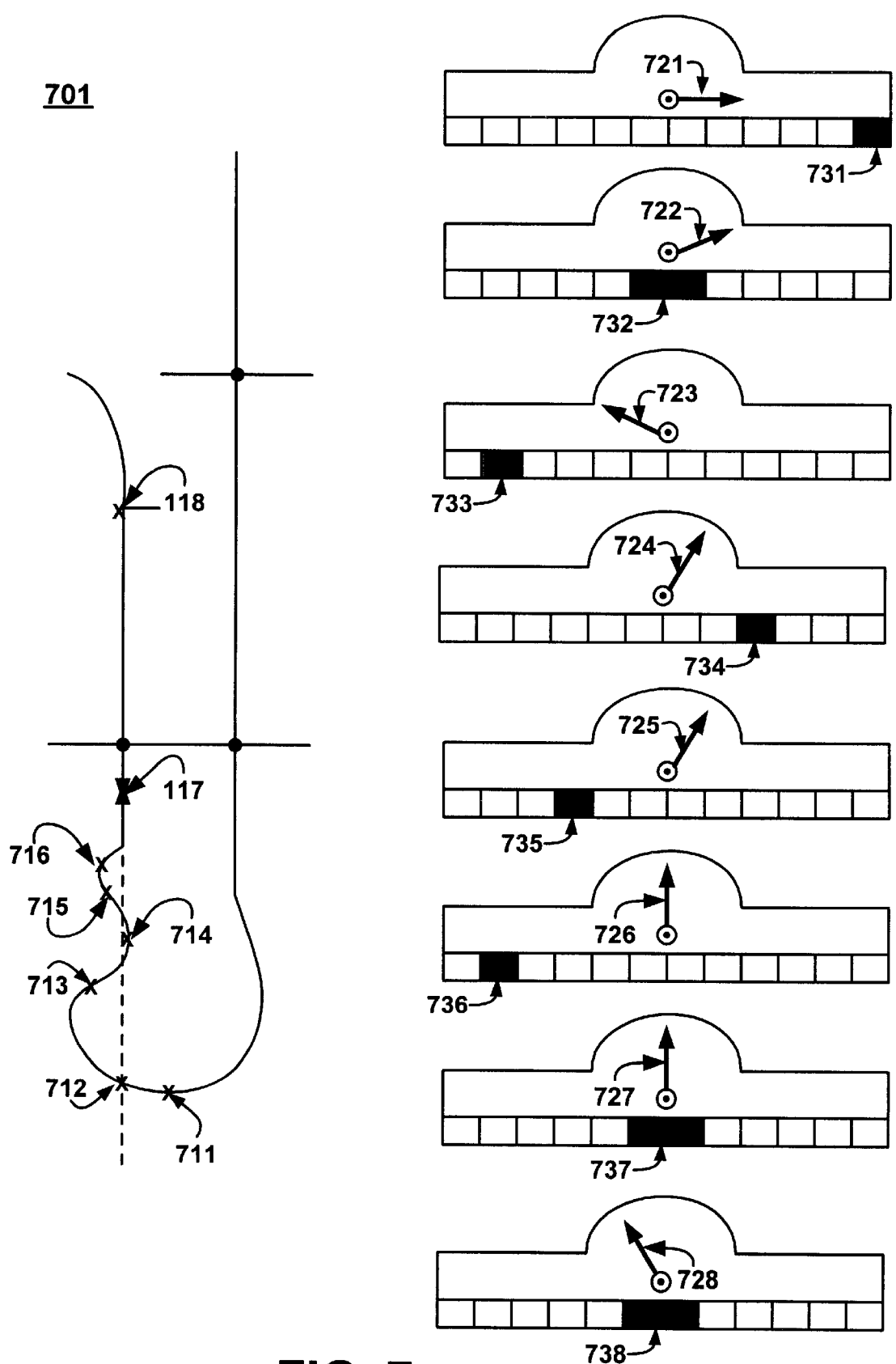
FIG. 7 is an illustration of an off heading indications and off line indications provided by one embodiment of the present invention when following a guidance path.

FIG. 7 is an illustration of an off heading indications and off line indications provided by one embodiment of the present invention when following guidance path 710. At point 711 on the guidance path the position of the vehicle (e.g., aircraft or tractor) has a right off track error shown by lighted LED 731 with a required heading correction of right 90 degrees shown by position 721 of the analog needle off heading indicator. At point 712 on the guidance path the vehicle has zero tracking error indicated by LED 732 but still has a required heading correction of right 70 degrees shown by position 722 of the analog needle. At point 713 on the guidance path the vehicle has left off track error shown by the lighted LED 733 with a required heading correction of left 70 degrees shown by analog needle position 723. Lighted LED 734 indicates the vehicle has right off track error for position 714 with the analog needle position 724 showing a required heading correction of right 30 degrees. A left off track error is shown by the lighted LED 735 with analog needle position 725 indicating a required heading correction of right 45 degress for point 715 of the guidance path 701. At point 716 the vehicle has a left off track error shown by the lighted LED 736 with a no heading correction indication by analog needle position 746. For point 717 the dual mode indication system LED 727 shows a zero off track error and analog needle position 727 indicates no heading correction required. Guidance path 701 starts on a curved path at point 718 and the dual mode indication system LED 738 shows a zero off track error with analog needle position 728 showing a heading correction of 20 degree left required by the look ahead feature for curve following.

FIG. 8 is a flow chart of dual mode indication method 800, one embodiment of the present invention. Dual mode indication method 800 provides off line and off heading information in a convenient and easy to comprehend manner.

In step 810 navigation information is processed. In one embodiment of the present invention the navigation information includes GPS information. In one exemplary implementation of the present invention the GPS information includes relative orbital positions of a GPS satellite and encoded time of transmission. In one embodiment of the present invention, satellite orbital data is received and utilized to determine the time between transmission by the satellite and reception by the receiver. This information is utilized to determine a pseudo-range measurement of four or more satellites. A precise vehicle location in three dimensions, vehicle velocity, and a time offset (which is used to generate a very precise time reference) are calculated.

In step 820 vehicle off line information and off heading information is determined. In one embodiment of the present invention, a dual mode indicator compares desired guidance path lines with actual lines of travel derived from the navigation information processed in step 810. By comparing the desired line with an actual line, off line information associated with the actual position of a vehicle relative to the desired line is ascertained. Information indicating a heading a vehicle should take to get back on line is calculated. In one exemplary implementation of the present invention a look ahead feature ascertains appropriate heading adjustments for curve following.

In step 830 an easy to comprehend dual mode presentation of the off line and off heading information is provided. In one embodiment of the present invention a LED light bar is utilized to provide off line information. The pattern of illuminated LEDs changes to the left or right in accordance with the off line calculation performed in step 820. In one exemplary implementation of the present invention an analog needle is used to provide off-heading information. The analog needle rotates to point out off heading correction information to the vehicle operator.

Thus, the system and method of the present invention is a system and method that provides two different types of navigational information (e.g., off-line and off heading) in a convenient format that is easy for an operator to comprehend. The two different types of information are presented in a single device presentation configuration that is efficient and effective. The user friendly intuitive format assists an operator to maneuver a vehicle to line up and be located on a particular path (e.g., a track) with zero off track error and zero heading error. The present invention facilitates greater navigation accuracy with minimal sensory resource commitment and reduced operator fatigue.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A dual mode indication system for providing two different types of navigation information, comprising;
    a dual mode indicator that simultaneously provides off line and off heading information in a convenient and easy to comprehend presentation;
    a controller coupled to said dual mode indicator, said controller controls said dual mode indicator; and
    a communication bus coupled to said dual mode indicator, said communication bus communicates information from said controller to said dual mode indicator.

2. The dual mode indication system of claim 1 wherein said dual mode indicator comprises an off line indicator that presents off line information relative to a desired guidance pattern.

3. The dual mode indication system of claim 1 wherein said dual mode indicator comprises a light emitting diode (LED) light bar off line indicator that presents off line information.

4. The dual mode indication system of claim 3 wherein said light emitting diode (LED) light bar off line indicator comprises a plurality of LEDs some of which are selectively lighted to provide an indication of an actual line of travel relative to a desired line of travel.

5. The dual mode indication system of claim 3 wherein said light emitting diode (LED) light bar off line indicator is configured as a semicircular pattern in the middle to provide the impression of a spirit level.

6. The dual mode indication system of claim 3 wherein said light emitting diode (LED) light bar off line indicator is configured is a semicircular pattern in the middle to assist a vehicle operator to decide on an appropriate course of action at the beginning and at point during a swath.

7. The dual mode indication system of claim 3 wherein said light emitting diode (LED) light bar off line indicator comprises:
 a semicircular configuration section that provides an indication an operator should continue guidance on the desired track and make corrections; and
 a horizontal configuration section coupled to said semicircular configuration section, said horizontal configuration section that provides an indication an operator should start the desired track again.

8. The dual mode indication system of claim 1 wherein said dual mode indicator comprises an off heading indicator that presents an indication in a convenient and easy to comprehend format of an appropriate heading adjustment for bringing a vehicle back on a desired line of travel.

9. The dual mode indication system of claim 8 wherein said off heading indicator provides a look forward indication for following a curve.

10. The dual mode indication system of claim 1 wherein said dual mode indicator comprises an analog needle.

11. The dual mode indication system of claim 10 wherein said analog needle rotates to provide an indication of an appropriate heading for a vehicle.

12. The dual mode indication system of claim 1 wherein said dual mode indicator comprises a lighted light emitting diode (LED) pattern.

13. The dual mode indication system of claim 12 wherein said lighted LED pattern comprises a circular configuration of rectangular light emitting diode (LED )hash marks.

14. The dual mode indication system of claim 1 wherein said controller includes a global positioning system (GPS) receiver that receives and processes vehicle positioning information.

15. The dual mode indication system of claim 14 wherein said GPS receiver provides a computer system platform for executing software routines which assist implement the functionality of performing off line indication and off heading indication.

16. The dual mode indication system of claim 15 wherein said GPS receiver comprises:

an antenna that receives global positioning system (GPS) signals;
 a down converter coupled to said antenna, said down converted down converts said GPS signals;
 a digital signal processor coupled to said down converter, said digital signal processor de-spreads and demodulates said GPS signals;
 an internal embedded computer coupled to said digital signal processor, said internal embedded computer computes the correct pseudo ranges and determine the GPS-based position and velocity; and
 a communications port coupled to said internal embedded computer, said communications port provides a communication path for navigation information.

17. A dual mode indication method for providing off line and off heading information comprising the steps of:
 processing navigation information;
 determining vehicle off line information and off heading information; and
 providing an easy to comprehend dual mode simultaneous presentation of said off line information and said off heading information.

18. A dual mode indication method of claim 17 wherein said navigation information includes GPS information.

19. A dual mode indication method of claim 17 further comprising the steps of:
 receiving satellite orbital data;
 utilizing said satellite orbital data to determine the time between transmission by a satellite and reception by a receiver;
 using said time between transmission by said satellite and reception by said receiver to determine a pseudo-range measurement of four or more satellites; and
 calculating a precise vehicle location in three dimensions, vehicle velocity, and a time offset.

20. A dual mode indication method of claim 17 further comprising the step of comparing desired guidance path lines with actual lines of travel to ascertain actual line off line information associated with the actual position of a vehicle relative to a desired line.

21. A dual mode indication method of claim 17 further comprising the step of calculating information indicating a heading a vehicle should take to get back on a desired line.

22. A dual mode indication method of claim 17 further comprising the step of utilizing a look ahead feature to ascertain appropriate heading adjustments for curve following.

23. A dual mode indication method of claim 17 further comprising the step of utilizing an LED light bar to provide off line information by changing the pattern of lighted LEDs to the left or right in accordance with an off line calculation.

24. A dual mode indication method of claim 17 further comprising the step of using an analog needle to provide off-heading information by rotating said analog needle to point out off heading correction information to the vehicle operator.

* * * * *